R. M. CARDWELL & J. B. THOLEN.
PROPORTIONING WEIGHING MACHINE.
APPLICATION FILED SEPT. 8, 1910.
1,001,503.
Patented Aug. 22, 1911.
4 SHEETS—SHEET 2.
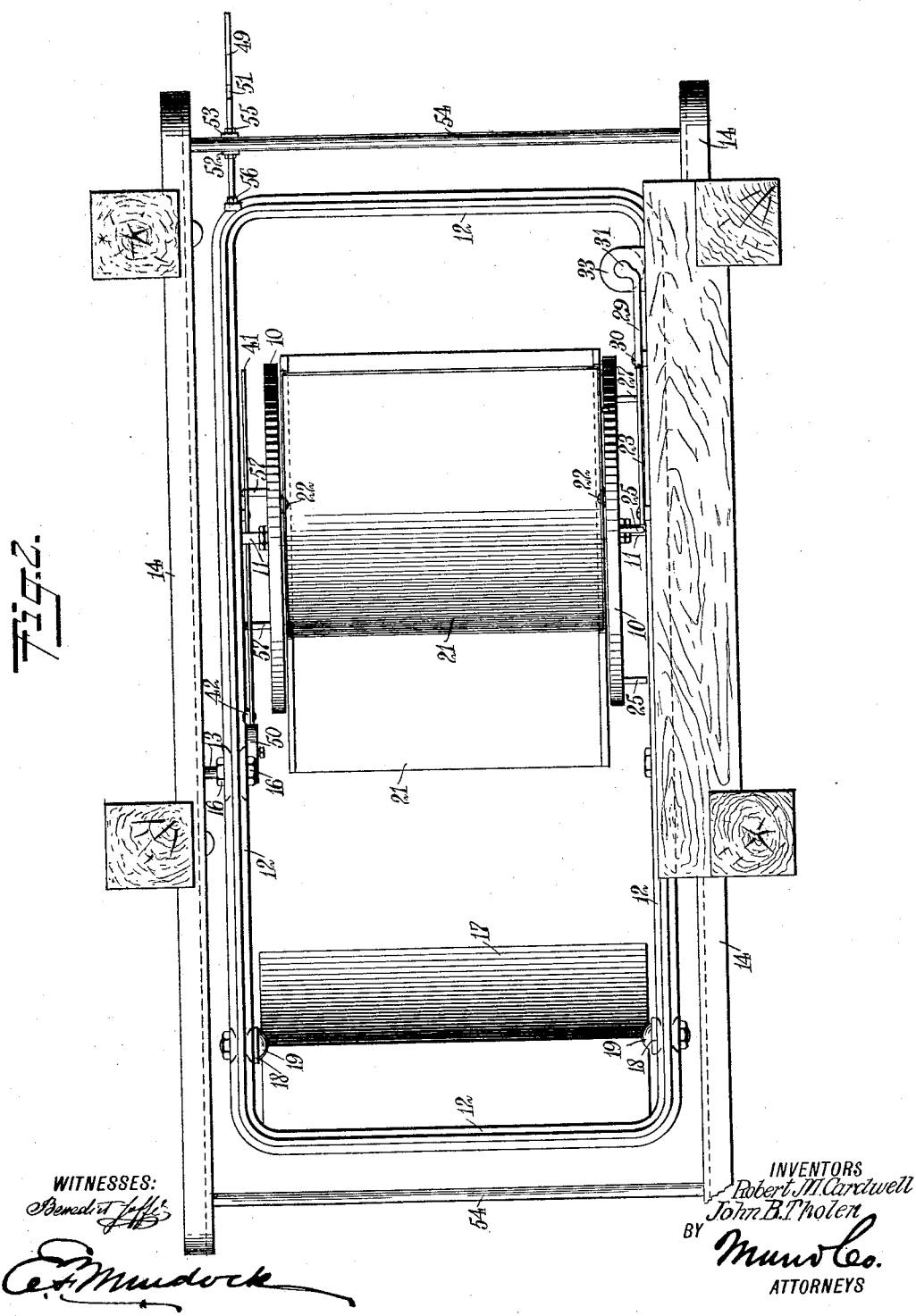
WITNESSES:
INVENTORS
Robert M. Cardwell
John B. Tholen
BY
Munn & Co.
ATTORNEYS

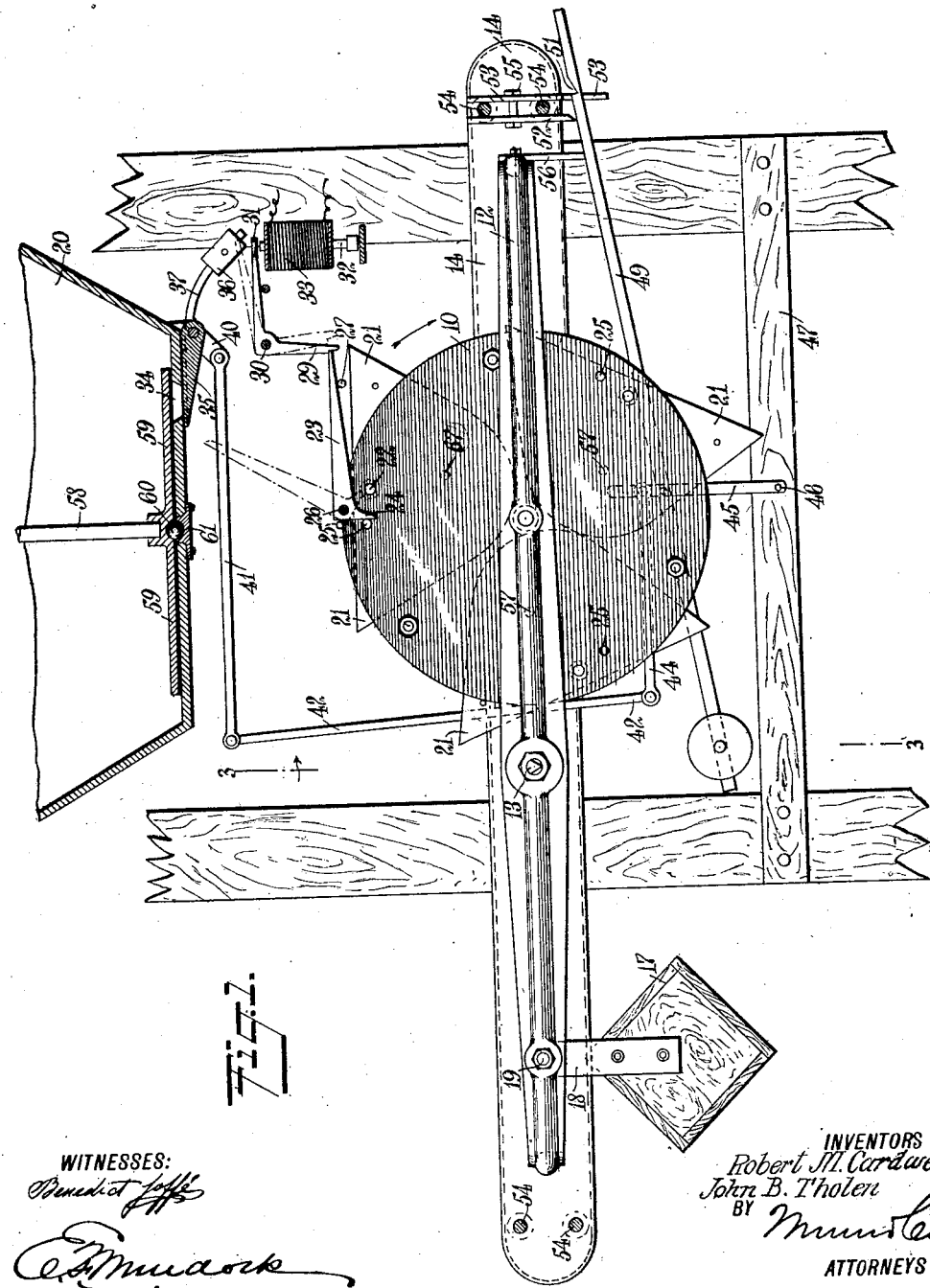

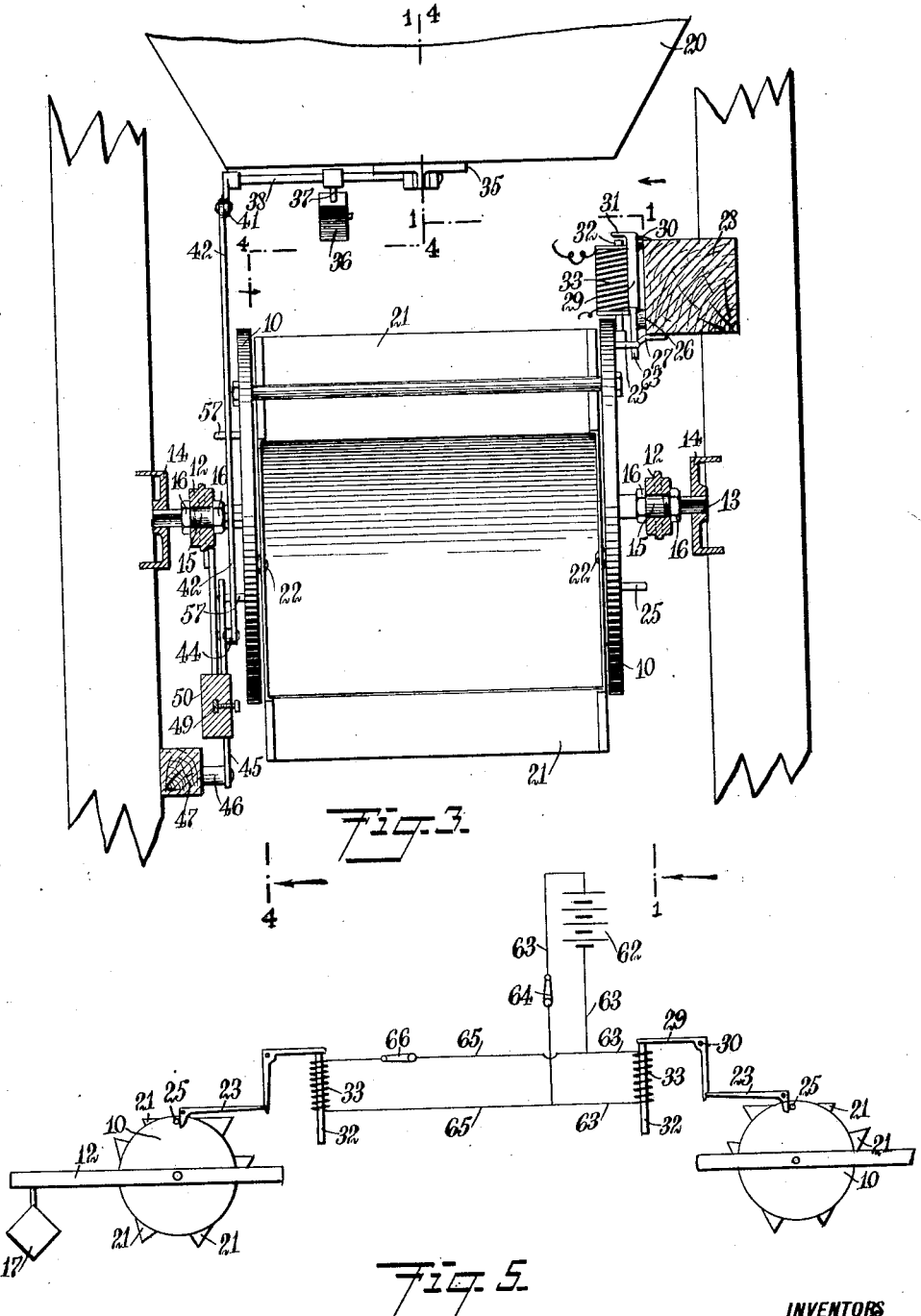

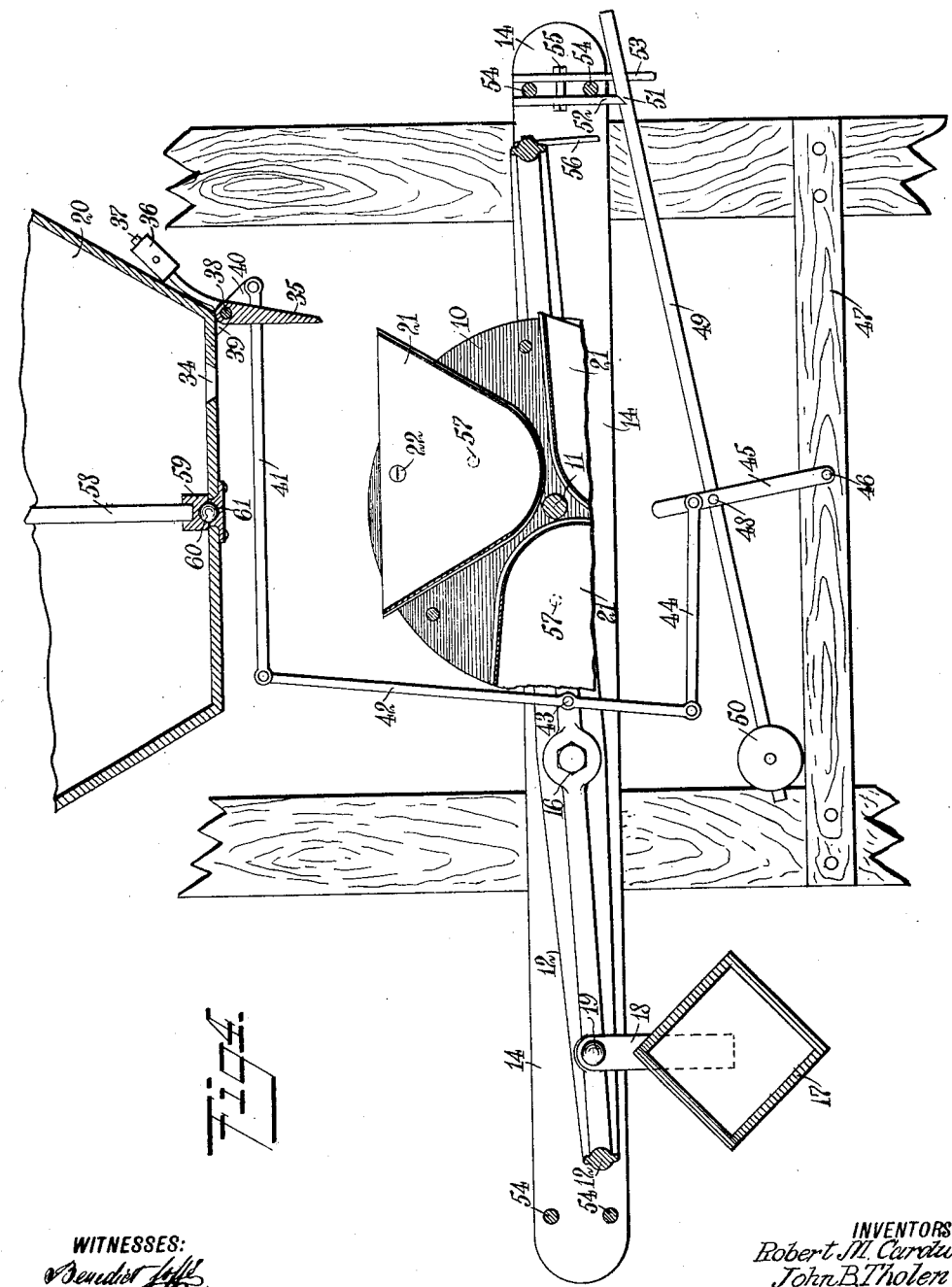

UNITED STATES PATENT OFFICE.

ROBERT M. CARDWELL AND JOHN BEN. THOLEN, OF TERRELL, TEXAS.

PROPORTIONING WEIGHING-MACHINE.

1,001,503.  Specification of Letters Patent.  Patented Aug. 22, 1911.

Application filed September 8, 1910. Serial No. 580,987.

*To all whom it may concern:*

Be it known that we, ROBERT M. CARDWELL and JOHN BERNHARD THOLEN, citizens of the United States, and residents of Terrell, in the county of Kaufman and State of Texas, have invented a new and Improved Proportioning Weighing-Machine, of which the following is a full, clear, and exact description.

Among the principal objects which the present invention has in view are: to provide a plurality of measuring mechanisms arranged to automatically suspend the delivery of material thereto; to provide an electrically-operated means for dumping one or more of said measuring mechanisms simultaneously; and to provide means whereby the number and combination of the weighing apparatuses may be regulated and controlled.

One embodiment of the present invention is presented in the structure illustrated in the accompanying drawings, in which like characters of reference indicate corresponding parts in all the views, and in which—

Figure 1 is a vertical longitudinal section of a measuring mechanism constructed and arranged in accordance with the present invention, the section being taken on the line 1—1 in Fig. 3; Fig. 2 is a plan view of a weighing mechanism constructed in accordance with the present invention; Fig. 3 is a vertical cross section taken on the line 3—3 in Fig. 1; Fig. 4 is a vertical longitudinal section taken on the line 4—4 in Fig. 3; and Fig. 5 is a diagrammatic view showing the electrical lay out for operating the various measuring mechanisms simultaneously.

The present invention is employed chiefly in manufactures where it is desired to mix certain compounds under conditions which render it difficult for a mechanic or other person to ascertain the relative proportions of the various components. In arranging the factory, the plan usually followed is that several mechanisms of the character herein shown and described are employed, and usually these mechanisms are arranged in different departments or rooms in the factory. The filling and dumping of the measuring mechanisms are controlled from a central station and actuated by a single person. It becomes necessary under conditions such as those pointed out that certain operations of the measuring mechanism shall be automatic. It is also desired that the dumping or delivering of the various mechanisms shall be simultaneous and shall be manually controlled, thereby regulating the total quantity of the resultant compound.

The weighing mechanisms shown in the accompanying drawings are weight-controlled. Each mechanism is provided with a plurality of pivoted disks 10, 10. The disks 10, 10 are pivotally mounted upon the pivot shaft 11. The shaft 11 is pivotally mounted in the frame 12. The frame 12 is supported on knife-edge pivots 13, seats for which are formed in the side rails 14, 14. The pivots 13 are extended from short shafts 15, 15 and are locked in fixed relation upon the frame 12 by means of the nuts 16, 16, as most clearly shown at Fig. 3 of the drawings. The frame 12 is normally overbalanced by a weight carried in a weight box 17. The weight box 17 is of any suitable construction and is suspended by means of straps 18, 18 upon pivots 19, 19 mounted in the frame 12.

The weight in the box 17 is lifted when the material delivered from the hopper 20 into the buckets 21, 21 overbalances the weight in the said box 17. The buckets 21, 21 are pivoted at 22, 22 between the disks 10, 10.

The disks are normally arrested in position wherein the pivots 22, 22 of the uppermost bucket 21, which is in receiving position, over-balances the disks or in other words is disposed at one side of the vertical median line passing through the shaft 11 as best seen at Fig. 4 of the drawing. The disks are normally held in this position by a latch 23. The short end 24 thereof is extended into the path of a series of pins 25, 25. The pins 25, 25 are extended outwardly from the side of one of the disks 10, as is clearly shown in Figs. 2 and 3 of the drawings.

In the position of the frame 12 when the buckets 21, 21 are empty, the pins 25 are lifted to the position shown in dotted lines in Fig. 1 of the drawings, which position is above the pivot 26 of the latch 23. The disposition of the pins 25 on the disk 10 at the heel of the latch 23 prevents the lift of the said latch, should the keeper thereof be tampered or meddled with. The latch 23 normally rests upon a pin 27 set off from the framing member 28, which member also supports the pivot 26 of the latch 23.

In its position of rest upon the pin 27, the latch 23 is held by a short arm on a bell crank keeper 29. The keeper 29 is pivotally mounted on the shaft 30, set off from the framing member 28. The long or horizontal arm of the keeper 29 is flattened to form a foot 31 against which the plunger 32 strikes, when drawn upward from the position shown in Fig. 1 of the drawings by a solenoid 33.

The hopper 20 is provided in the bottom thereof with a delivery passage 34. The passage 34 is normally closed by a gate 35, said gate being held in closing position by a counterbalancing weight 36. The weight 36 is fixedly mounted on an extended arm 37, the arm 37 and gate 35 being pivoted on a shaft 38, pivotally mounted in brackets 39. The shaft 38 is provided with an arm 40, to which is pivotally connected the pull rod 41. The rod 41 is pivotally connected to a rocking arm 42 which is pivoted at 43 on the frame 12.

The lower end of the arm 42 is pivotally connected to a loop 44 which is connected to a lever 45. The lever 45 is fulcrumed at 46 on the framing member 47. The lever 45 is pivotally connected at 48 with a balancing rod 49. The rod 49 is lifted at the outer end by a weight 50 adjustably and fixedly secured at the inner end of the said rod. The outer end of the rod 49 is provided with a notch 51. The notch 51 is provided to receive the bevel end of a plate 52.

The upper end of the rod 49 is guided between a plurality of guide rods 53, 53, as most clearly shown in Figs. 1 to 4, inclusive. The plate 52 and the rod 53 are fixedly mounted upon the side rails 14 by being clamped upon tie rods 54, 54. The plate 52 and rods 53 are clamped upon the tie rods 54 by means of a bolt 55.

When the plate 52 is seated in the notch 51, the rods 49 and 41 and arm 42 are disposed in the position shown in Fig. 4 wherein the said rods and levers serve to maintain in open position the gate 35. This is the delivery position for the hopper 20 to deliver the material contained therein to the bucket 21. When in the course of operation the bucket 21 receives material of the calculated weight to overbalance the weight in the box 17 the frame 12 is rocked downward at the end carrying the disks 10, 10 and the buckets 21.

Mounted rigidly upon the frame 12 is a striking pin 56. The striking pin 56 is disposed with reference to the rod 49 so that when the frame 12 is in horizontal extension the pin 56 impinges upon and presses the rod 49 sufficient to release the plate 52 from engagement with the notch 51. In this position of the rod 49 the gate 35 and the weight 36 connected therewith are unrestrained and permitted to resume the closed position as shown in Fig. 1 of the drawings. This action automatically arrests the delivery of the material from the hopper 20 into the bucket 21.

It will be noted that in the teetering of the frame 12 as above described, the pin 25 is moved from the position indicated by dotted lines in Fig. 1 to the position shown in full lines in said Fig. 1. The transposition of the pin 25, as indicated, removes the same from the rear of the heel of the latch 23 to the end of the short arm of the said latch in a position to lift the said latch. The latch 23 now serves to prevent the further depression of the disks 10, 10 and the buckets 21 carried thereby, until the latch is released by removing the keeper 29 from engagement therewith. The lower end of the keeper 29 is notched to over-ride the end of the latch 23, as shown at Fig. 1 of drawings, and the lower end of the keeper 29 is removed from the end of the latch 23 when and as the solenoid 33 is energized to lift the core of the plunger 32 when the keeper 29 is disposed in position as shown in dotted lines in Fig. 1 of the drawings.

The latch 23 being thus released the weight carried in the bucket 21 pressing on the short end of the latch lifts the same to the position shown in dotted lines in Fig. 1, until the bucket 21 passes under the short arms of the said latch.

It will be noted that the buckets 21 when arrested in position, as shown in Fig. 1 of the drawings, are suspended from the pivots 22 advanced beyond the shaft 11, 11, and therefore imparting to the disks 10, 10 a rotary impulse. When the pin 25 on the disk 10 is released by the latch 23, the impulse of the weight is answered and the disks 10, 10 rotate until the next succeeding pin 25 impinges upon and is arrested by the latch 23, which has resumed its normal position in which it is locked by the keeper 29. The rotation of the disks 10, 10 has carried the filled bucket 21 to a position in which the said bucket is upturned to be emptied of its contents.

Extended from the side of one of the disks 10 are a second series of pins 57, 57. These pins are extended to impinge upon the upper end of the lever 45 when and as the loaded bucket 21 is being carried to its final dumping position. The loaded bucket arrives in this position with a slight impetus and striking the upper end of the lever 45 carries the same backward, retracting the rod 49 until the notch 51 thereof passes under the plate 52. In this position the balancing weight 50 lifts the notch 51 into engagement with the plate 52. Coincident with the retraction of the rod 49, the arm 42 is rocked on its pivot 43 to throw the arm 40 to the position shown in Fig. 4 of the drawings, wherein the gate 35 is again opened. In this manner is one of the buckets 21 filled in close succession upon the emptying of the preceding bucket, thereby saving all loss of time in the operation of the various machines.

It will be understood that a number of such mechanisms as above described are operated over the same electrical circuit, each mechanism having a solenoid 33 and each solenoid being incorporated in the electrical circuit.

It is to prevent clogging of the material contained in the hopper 20 that I have provided a central shaft 58 and extending from the bottom thereof are agitating arms 59, 59. The shaft 58 and the arms 59 are mounted upon a pivot ball bearing 60. The pivot ball is mounted in a cupped bearing 61. The arms 59, 59 are extended to sweep over the passage 34, which is closed by the gate 35.

In Fig. 5 of the drawings is shown in diagrammatic form the circuits for operating the solenoids 33 on the various mechanisms. The main circuit as shown in the diagram embodies an electric source as a battery 62. From the battery 62 the mains 63 and 63 are extended. The main 63 is controlled by a switch 64. The circuit embodying the main 63 also embodies the solenoids 33 of the principal weighing mechanism or the mechanism in which is weighed or measured the largest amount of the various components forming the compound being mixed. From the circuit embodying the main 63 is extended branch circuits 65 embodying other solenoids 33, each of the branch circuits being controlled by a switch 66.

While I have shown in the drawings the employment of one main circuit embodying the main 63 and one branch circuit embodying the wires 65, it will be understood that the number of branch circuits may be multiplied, each forming independent connection with the two mains of the circuit embodying the mains 63, and each having a switch similar to the switch 66 by which each is controlled. The various ground circuits when thus connected when the switches are closed are operated by the switch 64 under the control of the attendant. The operation of the solenoids 33 and the plungers 32 and the result of such operation have been above set forth.

It will be observed that when an establishment is equipped with a system arranged as set forth, it is possible for an attendant to control the mixing of a compound without imparting information to the various mechanics in charge. Thus in one room or from one hopper 20 may be received a certain weight measured quantity of one ingredient, in another compartment a certain other measured quantity of another ingredient, in a third compartment a third measured quantity of a third ingredient, and in the fourth or main compartment a fourth quantity can be thus measured. It will be understood that in each instance the various quantities are measured by automatic weight measuring devices of the character shown in the accompanying drawings and above set forth.

The usual installation would recognize the fact that the measuring device provided for the principal ingredient would be located at the station of the operator and where the controlling switch 64 is located. Under usual conditions the swing of the weighing mechanism and of the frame 12 thereof would notify the operator that the largest quantity of the various ingredients had been delivered to the weighing mechanism. By then closing the switch 64, the operator would energize each of the solenoids 33 at the various stations to permit the release of the latches 23 on all of the mechanisms to allow the buckets 21 at each station to deliver its ingredient to chutes or conduits provided for bringing each of the ingredients simultaneously to a central or general mixing station.

It will be observed that in each of the measuring mechanisms the latch 23 may not be released by accidental or meddlesome closure of the switch 64 until the main weighing mechanism has balanced so that the pin 25 thereof passes below the level of the pivot 26 of the latch 23. This is not accomplished until the predetermined quantity in weight measure has been delivered into the bucket 21. The above statement is true of each of the various weighing or measuring mechanisms.

Having thus described our invention, we claim as new and desire to secure by Letters Patent:

1. A proportioning weighing machine, comprising a balancing frame; a weighted member therefor; a plurality of disks pivotally mounted on said frame; a plurality of buckets pivotally mounted on said disks; a latch for arresting said disks to dispose said buckets successfully in receiving position; and an electrically operated device for releasing said latch after the buckets have received a predetermined load.

2. A proportioning weighing machine, comprising a balancing frame; a weighted member therefor; a plurality of disks pivotally mounted on said frame; a plurality of receiving buckets pivotally mounted between said disks; a hopper disposed above and in delivering relation to said buckets;

a weight operated valve for said hopper; a latch mechanism adapted to hold the said valve in open position; means connected with said buckets for setting said latch; and means connected with said frame for releasing said latch when and as each of said buckets is carried to its delivery position.

In testimony whereof we have signed our names to this specification in the presence of two subscribing witnesses.

ROBERT M. CARDWELL.
J. BEN. THOLEN.

Witnesses:
M. F. CATE,
E. R. MILLER.

Copies of this patent may be obtained for five cents each, by addressing the "Commissioner of Patents, Washington, D. C."